US006046452A

United States Patent [19]

Castleman et al.

[11] Patent Number: 6,046,452

[45] Date of Patent: Apr. 4, 2000

[54] PROCESS AND SYSTEM FOR FLAME DETECTION

[75] Inventors: David A. Castleman, Claremont; Chris A. Selstad, Fullerton; Theodore R. Lapp, Coto de Caza, all of Calif.

[73] Assignee: Fire Sentry Systems, Inc., Cleveland, Ohio

[21] Appl. No.: 08/690,067

[22] Filed: Jul. 31, 1996

Related U.S. Application Data

[63] Continuation-in-part of application No. 08/609,740, Mar. 1, 1996.

[51] Int. Cl.[7] .............................. G01J 1/42; G08B 29/00

[52] U.S. Cl. .............................. 250/339.15; 250/252.1 A; 340/587

[58] Field of Search .............................. 250/339.15, 341.5, 250/346, 252.1 A; 340/577, 578, 587

[56] References Cited

U.S. PATENT DOCUMENTS

| | | | |
|---|---|---|---|
| 4,701,624 | 10/1987 | Kern et al. | 250/554 |
| 4,742,236 | 5/1988 | Kawakami et al. | 250/554 |
| 5,399,856 | 3/1995 | Sandridge et al. | 250/252.1 A |
| 5,552,763 | 9/1996 | Kirby | 340/587 |

FOREIGN PATENT DOCUMENTS

| | | |
|---|---|---|
| 0159798 | 10/1985 | European Pat. Off. . |
| 0175032 | 3/1986 | European Pat. Off. . |
| 0618555 | 10/1994 | European Pat. Off. . |
| 2012092 | 7/1979 | United Kingdom . |

*Primary Examiner*—David P. Porta
*Assistant Examiner*—Richard Hanig
*Attorney, Agent, or Firm*—Lyon & Lyon LLP

[57] ABSTRACT

The present invention provides a highly sensitive, intelligent, reliable, and effective process and system for detecting fire, which may be used in any industrial or other environment. The process and system for flame detection in accordance with the present invention features wide infrared spectrum sensitivity, which facilitates increased sensitivity to any sign of a flame or fire. The process and system of the present invention utilizes digital processing and analysis of data, calibration of operation parameters from temperture data, an intelligent controller (microprocessor) for discriminating against false alarms, and an elaborate multi-stage alarm system, selectively triggered by the controller.

1 Claim, 18 Drawing Sheets

ALERT TYPE EVENT

FIRE PIC NUMBER: 4

FIRE EVENT DATE 5 / 30 / 96
TIME 0 : 51 : 27 AM

DETECTOR
SERIAL NUMBER A A C S 10635

VIN 8.8 VOLTS

TEMPERATURE 68 F 20 C

CONTROLLER DIP SWITCH SETTINGS AT TIME OF FIRE EVENT:
4 SECONDS ALARM RESPONSE TIME
5 SECONDS LATCHING MODE FOR ALARM.
15 FEET DISTANCE FOR ALARM TO SEE 1 SQUARE FOOT GASOLINE FIRE.
30 FEET DISTANCE FOR ALERT TO SEE 2 CUBIC FOOT FIREBALL.
0.30 SECONDS ALERT RESPONSE TIME TO PAINT SPRAY FIREBALL.
5 SECONDS LATCHING MODE FOR ALERT.
1.0 SECONDS FIRE EARLY WARNING RESPONSE TIME
5 SECONDS LATCHING MODE FOR FEW.

*FIG. 9*

FIRE EARLY WARNING EVENT

FIRE PIC NUMBER: 2 FIRE EVENT DATE 5 / 30 / 96
TIME 0 : 46 : 13 AM

DETECTOR
SERIAL NUMBER A A C S 10635 VIN 8.8 VOLTS TEMPERATURE 66 F 19 C

CONTROLLER DIP SWITCH SETTINGS AT TIME OF FIRE EVENT:
4 SECONDS ALARM RESPONSE TIME
5 SECONDS LATCHING MODE FOR ALARM.
15 FEET DISTANCE FOR ALARM TO SEE 1 SQUARE FOOT GASOLINE FIRE.
30 FEET DISTANCE FOR ALERT TO SEE 2 CUBIC FOOT FIREBALL.
0.30 SECONDS ALERT RESPONSE TIME TO PAINT SPRAY FIREBALL.
5 SECONDS LATCHING MODE FOR ALERT.
1.0 SECONDS FIRE EARLY WARNING RESPONSE TIME
5 SECONDS LATCHING MODE FOR FEW.

*FIG. 10*

FIRE ALARM EVENT

FIRE PIC NUMBER: 3

FIRE EVENT DATE 5 / 30 / 96
TIME 0 : 46 : 11 AM

DETECTOR
SERIAL NUMBER A A C S 10635

VIN 8.8 VOLTS

TEMPERATURE 66 F 19 C

CONTROLLER DIP SWITCH SETTINGS AT TIME OF FIRE EVENT:
4 SECONDS ALARM RESPONSE TIME
5 SECONDS LATCHING MODE FOR ALARM.
15 FEET DISTANCE FOR ALARM TO SEE 1 SQUARE FOOT GASOLINE FIRE.
30 FEET DISTANCE FOR ALERT TO SEE 2 CUBIC FOOT FIREBALL.
0.30 SECONDS ALERT RESPONSE TIME TO PAINT SPRAY FIREBALL.
5 SECONDS LATCHING MODE FOR ALERT.
1.0 SECONDS FIRE EARLY WARNING RESPONSE TIME
5 SECONDS LATCHING MODE FOR FEW.

*FIG. 11*

PROCESS AND SYSTEM FOR FLAME DETECTION

RELATED SUBJECT MATTER

This application is a continuation-in-part of application Ser. No. 08/609,740, filed on Mar. 1, 1996, and entitled "Flame Detector and Protective Cover With Wide Spectrum Characteristics," the specification of which in hereby incorporated by reference in the present patent application for all purposes.

FIELD OF THE INVENTION

This invention relates generally to detection of sparks, flames, or fire in any environment faced with a fire threat, as for example, during electrostatic coating or painting (liquid or powder) operations of parts in a production line. More specifically, this invention relates to a process and system for detecting any sign of a spark, flame, or fire, with increased wide spectrum sensitivity, faster processing and response times, intelligence for discriminating against false alarms, and selective actuation of multi-stage alarm relays. The process and system of the present invention is not only reliable and effective in preventing fires, but, also, in eliminating unnecessary false alarms that disrupt routine operations.

BACKGROUND OF THE INVENTION

To prevent fires, and the resulting loss of life and property, the use of flame detectors or flame detection system is not only voluntarily adopted in many situations, but, is also required by the appropriate authority with jurisdiction for implementing the National Fire Protection Association's (NFPA) codes, standards, and regulations. Facilities faced with a constant threat of fire, such as petrochemical facilities and refineries, co-generation plants, aircraft hangers, silane gas storage facilities, gas turbines and power plants, gas compressor stations, munitions plants, airbag manufacturing plant, and so on, are examples of environments, which require constant flame detection.

To appreciate the significance of the fire detection system and process proposed by this patent application, an exemplary environment, where electrostatic coating or spraying operations are performed, is explained in some detail. However, it should be understood that the invention may be practiced in any environment faced with a threat of fire.

Electrostatic coating or spraying is a popular technique for large scale application of paint, as for example, in a production painting line. Electrostatic coating or spraying involves the movement of very small droplets of electrically charged "liquid" paint or particles of electrically charged "powder" paint from a electrically charged (40 to 120,000 volts) nozzle to the surface of a part to be coated. Most industrial operations use conventional air spray systems in which compressed air is supplied to a spray gun and to a paint container. At the gun, the compressed air mixes, rather violently, with the paint, causing it to break up into small droplets, which are propelled toward the surface of the part to be coated. The parts to be coated are transported through a coating zone by a mechanical conveyor, operated at ground potential.

Electrostatic coating of parts in a production paint line, while facilitating efficiency, environmental benefits, and many production advantages, presents an environment fraught with explosive fire hazards and safety concerns. For example, sparks are common from improperly grounded workpieces or faulty spray guns. In instances where the coating material is a paint having a volatile solvent, the danger of an explosive fire from sparking, or arcing, is, in fact, quite serious. Fires are also a possibility if electrical arcs occur between charged objects and a grounded conductor in the vicinity of flammable vapors.

Thus, in the present and the past, flame detectors have routinely been located at strategic positions in spray booths, to monitor any ignition that may occur, and to shut down the electrostatics, paint flow to the gun, and conveyors in order to cut-off the contributing factors leading to the fire.

A fire occurs largely because of three contributing factors: 1) fuel, such as, atomized paint spray, solvents, and paint residues; 2) ignition temperature derived from electrostatic corona discharges, sparking, and arcing from ungrounded workpieces, and so on; and 3) oxygen derived from the surrounding air. When a fuel's ignition temperature rises in the presence of oxygen, a fire occurs.

A mere electrical spark can cause the temperature of a fuel to exceed its ignition temperature. For example, in a matter of seconds, a liquid spray gun fire can result from an ungrounded workpiece producing sparks. An electrical spark can cause the paint (fuel) temperature at the point where the spark occurs to exceed its ignition temperature. The resulting spray gun fire can quickly produce radiant thermal energy, sufficient to raise the temperature of the nearby paint residue on the booth walls or floor, causing their temperature levels to exceed their ignition temperature. That leads the paint residue to burst into flames, without any direct contact with the spray gun.

Typically, a fire can self-extinguish, if the fuel supply or the factor contributing to the rise in ignition temperature is eliminated. If a fire fails to self-extinguish, flame detectors typically activate suppression agents to extinguish the fire to prevent major damage.

Flame detectors, which are an integral part of industrial operations such as the one described above, must meet standards set by the NFPA, which are becoming increasing more stringent. Thus, increased sensitivity, faster reaction times, and fewer false alarms are not only desirable, but, are becoming a requirement.

Conventional flame detectors currently available on the market have many drawbacks. For example, they can only sense radiant energy in one or more of either the ultraviolet, visible, or the near band infrared (IR) spectrum.

Moreover, such flame detectors are unreliable and fail to distinguish false alarms, such as those caused by radiant energy sources other than a fire. Disrupting the automated painting process in response to a false alarm has tremendous financial setbacks.

The unreliability of conventional flame detectors results from their simplistic approach to detecting fire. The most advanced ones available, at best, involve simple microprocessor (otherwise referred to as controller or microcomputer) controls such as those used in microwave ovens. Their sensitivity levels are calibrated only once, during manufacture. Typically, the sensitivity levels change as time passes, making such conventional flame detectors extremely unreliable.

Many of the conventional flame detectors utilize pyroelectric sensors, which sense only the change in radiant heat emitted from a fire. Such pyroelectric sensors depend upon temperature changes, and are susceptible to premature aging, and degraded sensitivity and stability, with passage of time.

Generally, they do not take into account natural temperature variations resulting from environmental temperature changes that occur, typically during the day, as a result of seasonal changes, or prevailing climatic conditions.

Conventional flame detectors also largely rely on their ability to detect unique narrow band spectral radiation from hot $CO_2$ (carbon dioxide) fumes emitted by a fire. Very hot $CO_2$ fumes from a fire emit a spike band of radiant energy, approximately 4.3 microns in magnitude. However, cold $CO_2$, typically discharged by suppression agents or resulting from a leak, absorbs energy at 4.3 microns. Thus, cold $CO_2$ can possibly absorb a hot $CO_2$ spike emission from a fire. Consequently, such conventional flame detectors, in many cases, can easily miss detecting a fire.

Conventional dual frequency infrared (IR) flame detectors cause false alarms when cold $CO_2$ is present between the fire source and the detector. Such conventional detectors utilize a dual frequency analog signal subtraction technique, which is misled into believing that a strong $CO_2$ emission spike from a fire is detected, when, in fact, a negative absorption spike (caused by a discharge or leak) is detected. This subtraction technique senses the $CO_2$ spike at 4.3 microns and subtracts a reference band spike at 3.8 microns. The false fire signal that results, fools the flame detector into declaring a false alarm.

Conventional ultraviolet sensors are sensitive to electrostatic spray gun fires and corona discharges from waterborne coatings, which can cause false alarms and needlessly shut down production in paint spray booths. Also, because arc welding produces copious amounts of intense ultraviolet energy ("UV"), "UV" flame detectors can detect this false fire "UV" energy even at far distances from the spray booth because of reflections. Moreover, conventional "UV" detectors are highly de-sensitized as a result of absorbing smoke and a solvent mist resulting from a fire. These absorbers serve to blind the "UV" detector. "UV" detectors can provide a false sense of security that they are operating at their optimum performance levels, when, in fact, they may be vulnerable to a catastrophic fire.

Moreover, "UV" detectors are blinded or degraded by the presence of paint or oil contaminants on their viewing window lens. Their sensing techniques do not take into account the effects of such types of degradation.

Thus, a sensitive, reliable, intelligent, and effective method and system for detecting fire, is desirable for automated industrial operations, with little or no interruptions caused by false alarms.

SUMMARY OF THE INVENTION

The present invention provides a highly sensitive, intelligent, reliable, and effective process and system for detecting sparks, flames, or fire, which may be used in any industrial or other environment. The process and system for flame detection in accordance with the present invention features wide infrared spectrum sensitivity, which facilitates increased sensitivity to any sign of a spark, flame, or fire. The process and system of the present invention utilizes digital processing and analysis of data, an intelligent controller (otherwise referred to as microprocessor or microcomputer) utilizing algorithms nd techniques for discriminating against false alarms, and an elaborate multi-stage alarm system, selectively triggered by the intelligent controller.

In accordance with one embodiment of the present invention, the present system comprises a single or a series of detector units with wide spectrum sensing capabilities (quantum sensors) located within a desired facility, as for example, inside a spray booth. Sensor data captured at the detector units is relayed to a controller located external to the spray booth, which processes and analyses the sensor data, and selectively triggers multi-stage alarm relays.

In accordance with an alternative embodiment of the present invention, the controller may be located within the detector unit itself. This embodiment may utilize a single-stage alarm relay or multi-stage alarm relays, which again are disposed within the detector unit itself. The sensor data is captured, as well as processed, and analyzed at the detection location.

The process and system of the present invention avoids false alarms by conducting comprehensive diagnostic evaluations of its system components. Diagnostic evaluation are performed at the outset, and repeated during routine operation, to ensure optimum performance levels. The present system programs parameters for its system components, and varies them depending upon ambient conditions. It utilizes algorithms and techniques for eliminating false alarms, while effectively detecting for any sign of a spark, flame, or fire.

In accordance with yet another feature, the present system generates a "FirePic," which provides a comprehensive record of sensor array spectral data, which may be retrieved after a fire occurs. This data can be analyzed and graphically displayed to ascertain the cause of a fire. A real-time graphical display for view by an operator is facilitated by the present systems "Snapshot" feature.

These and other features of the present method and system for detecting fire will become apparent in the detailed description that follows.

BRIEF DESCRIPTION OF THE DRAWING FIGURES

In the drawings, which constitute a part of the specification, exemplary embodiments exhibiting various objectives and features of the process and system of the present invention are set forth, specifically:

Figure 9A:
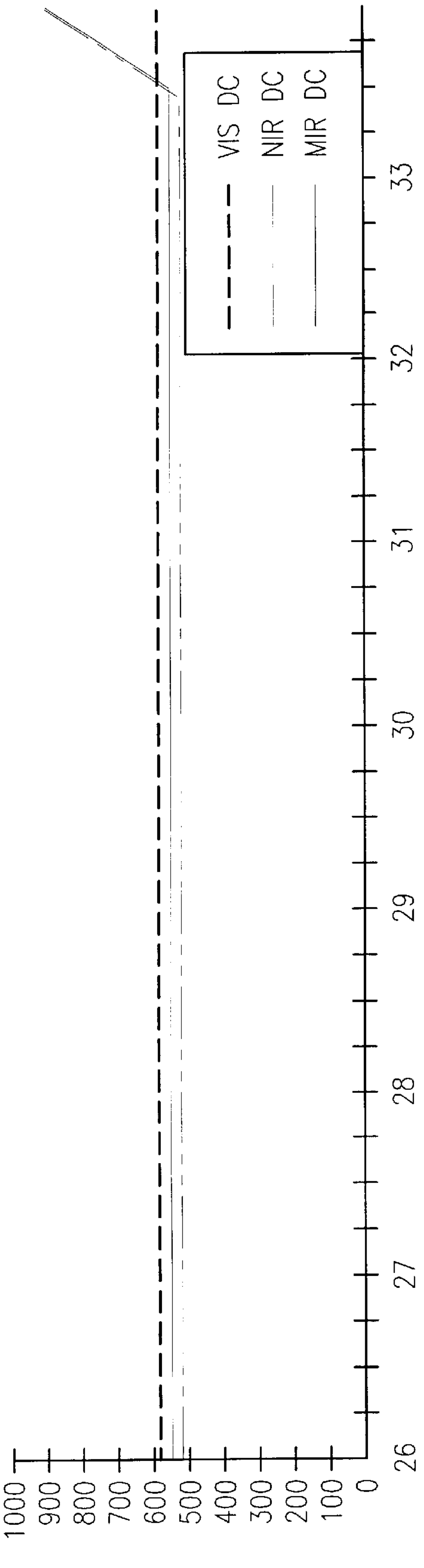
FIG. 9 is an exemplary event log generated by the "FirePic" generator for an exemplary fire signature warranting an "alert" condition; the event log may be stored, displayed on a monitor, or printed, as desired by a user.
Figure 9B:
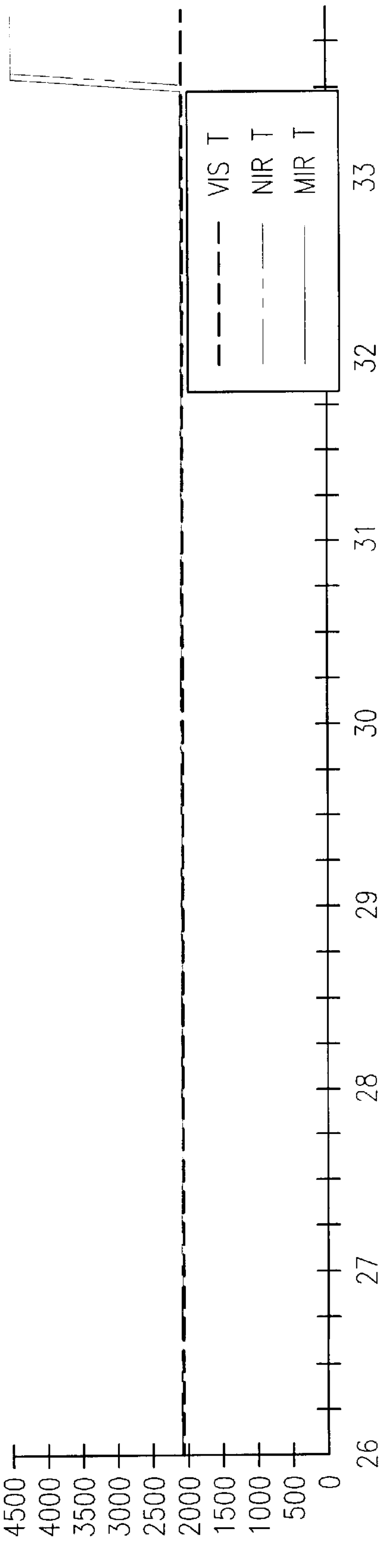
Figure 10A:
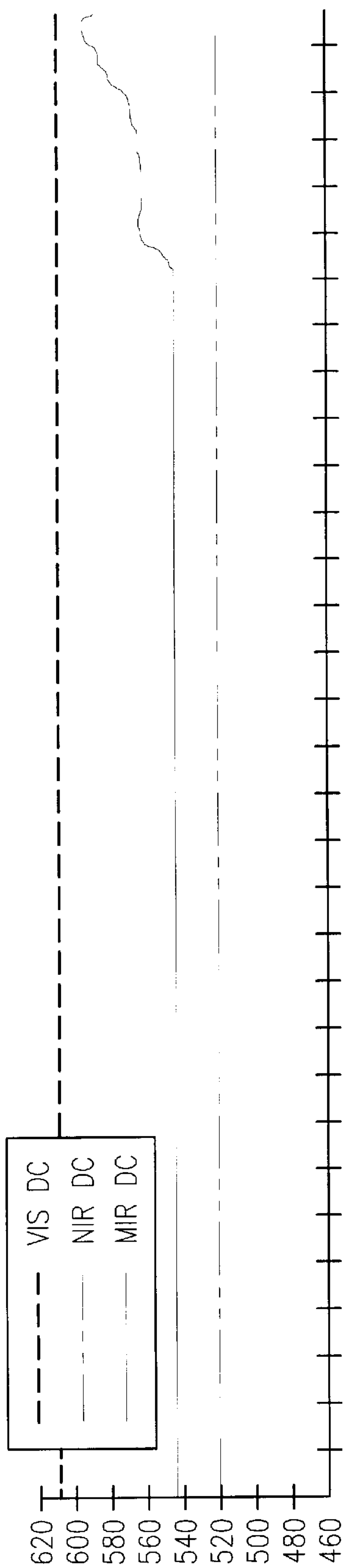
Figure 10B:
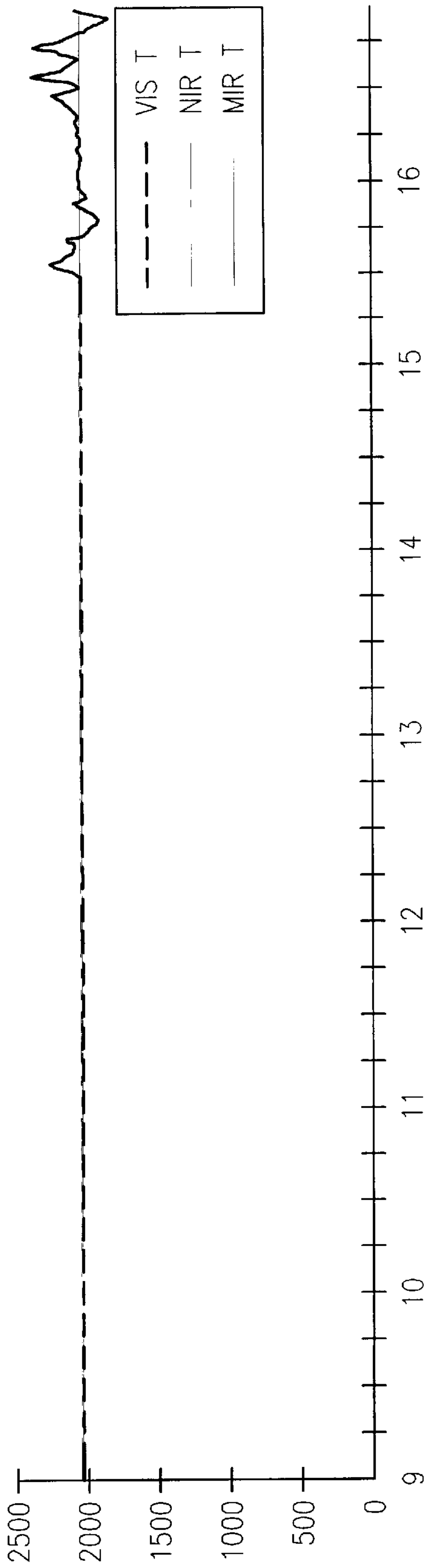
Figure 11A:
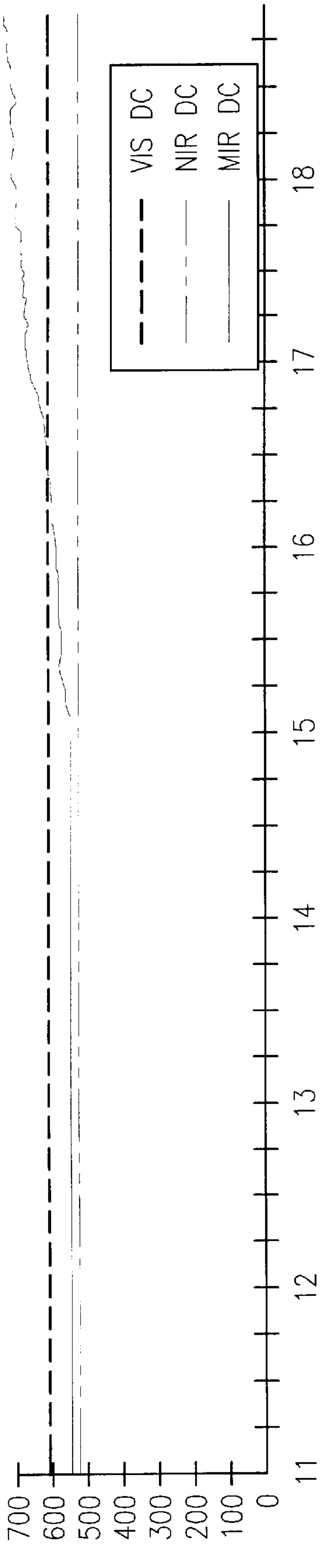
Figure 11B:
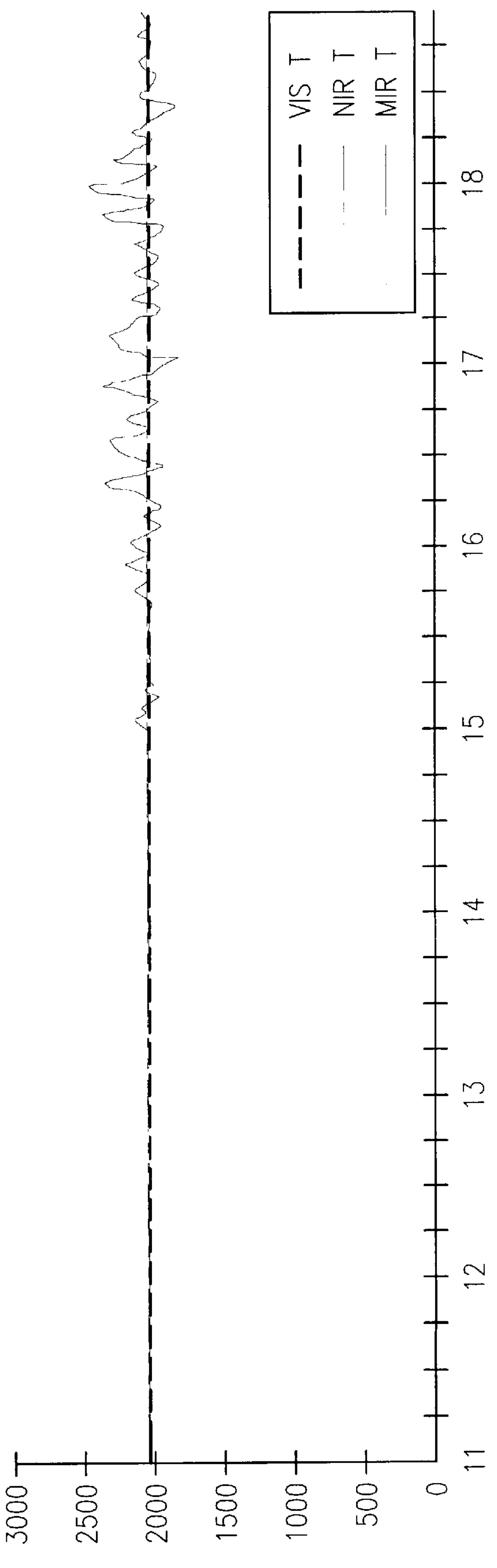
Figure 12:
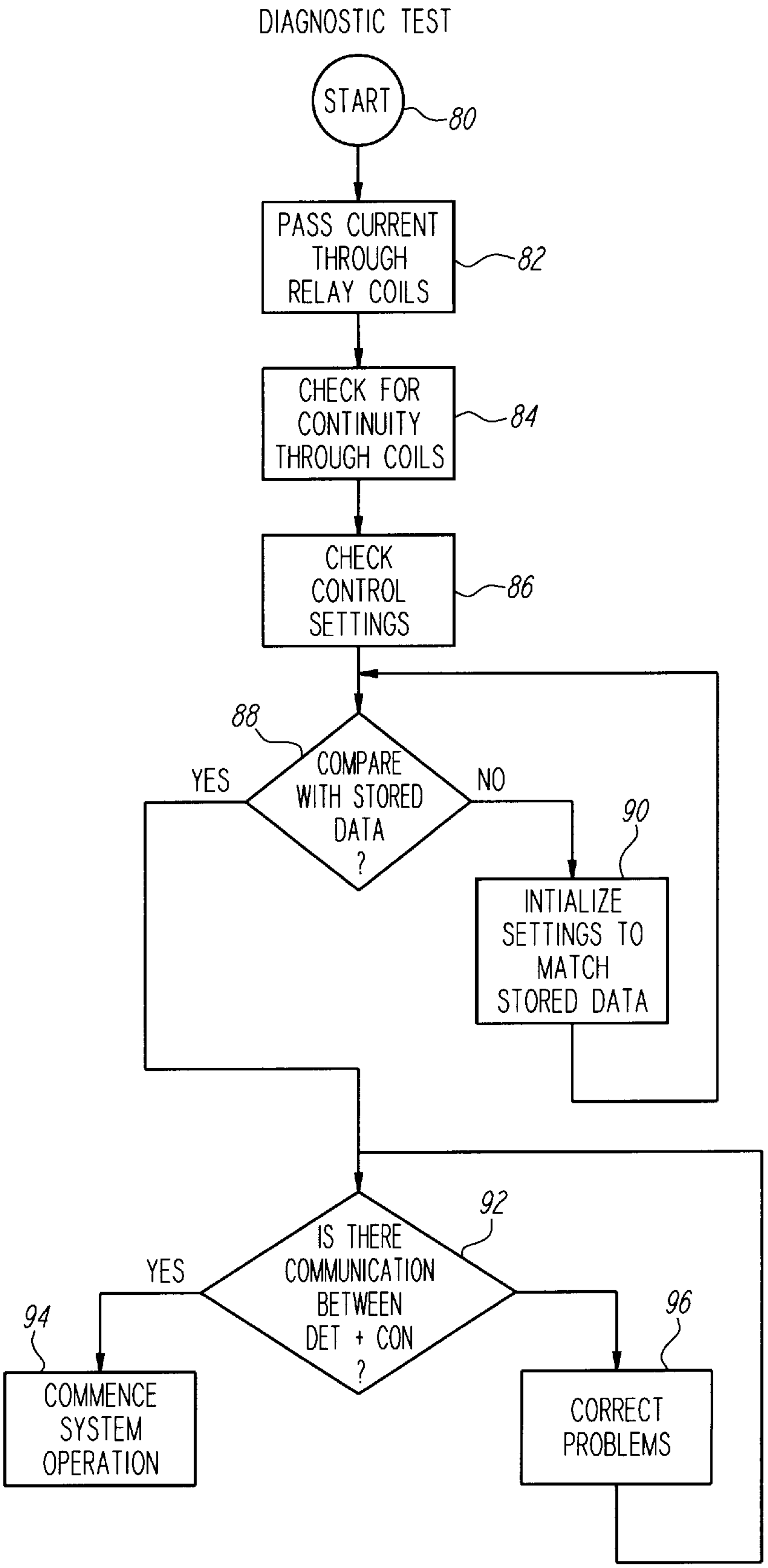
Figure 13:
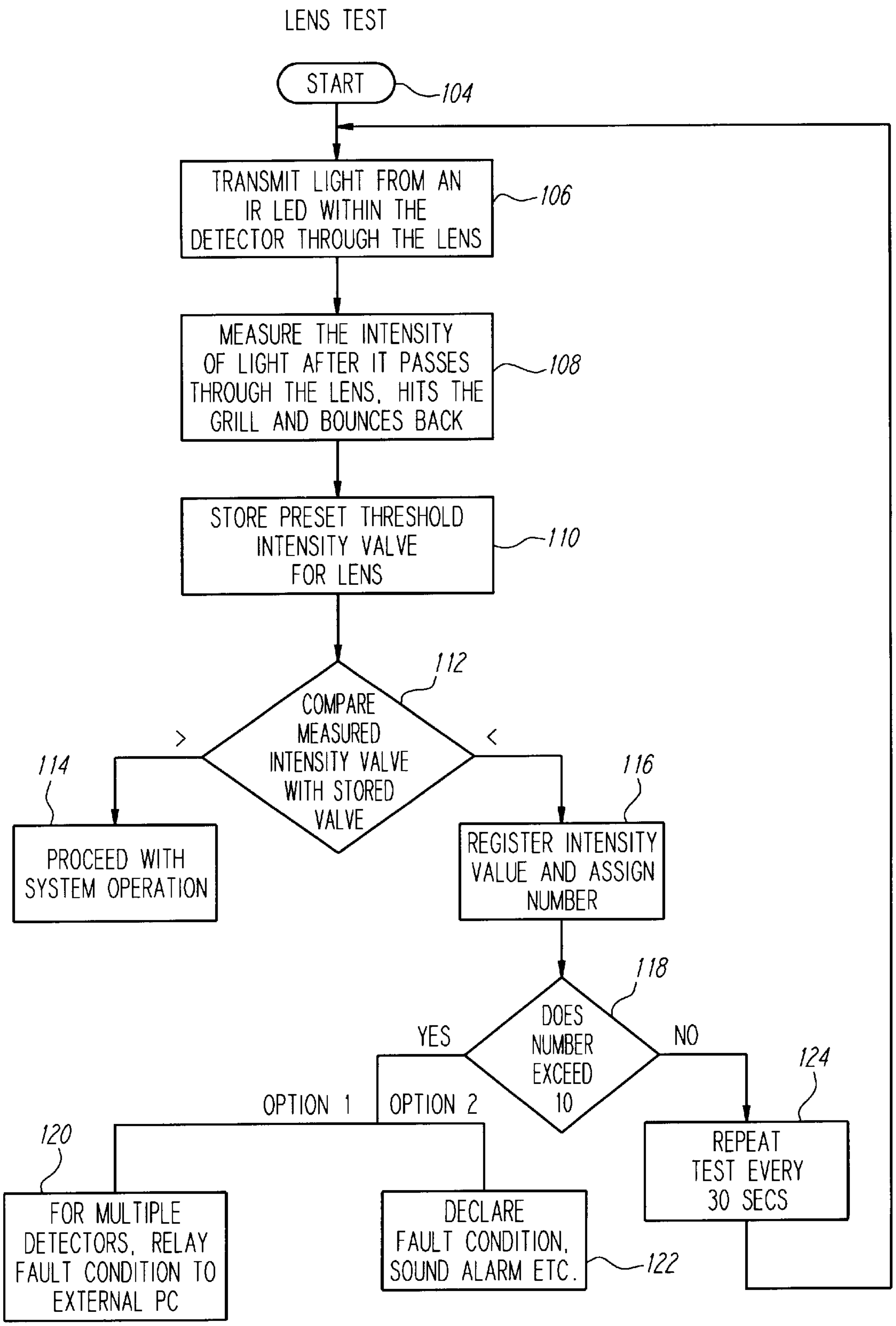
Figure 14:
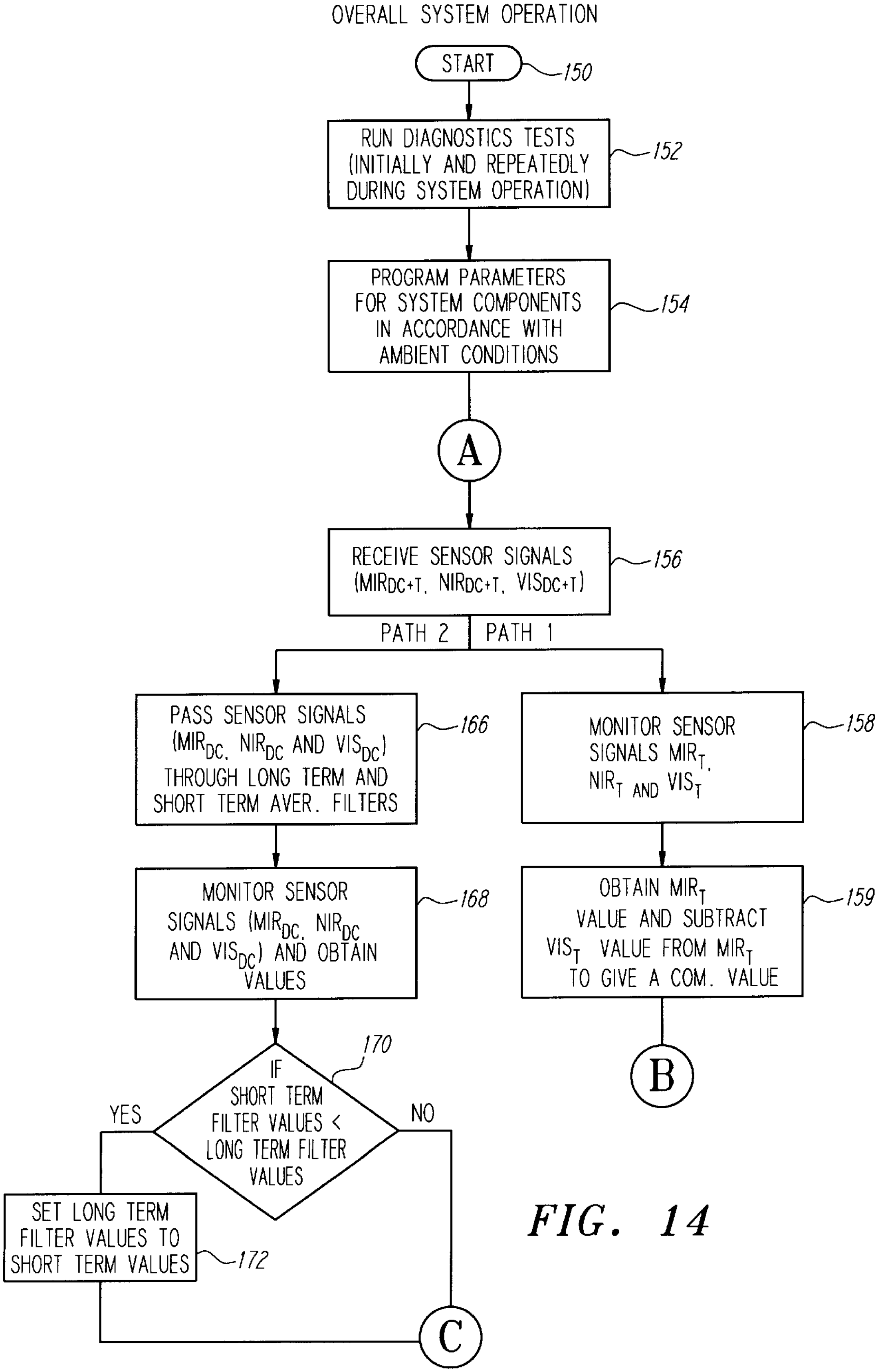
Figure 15:
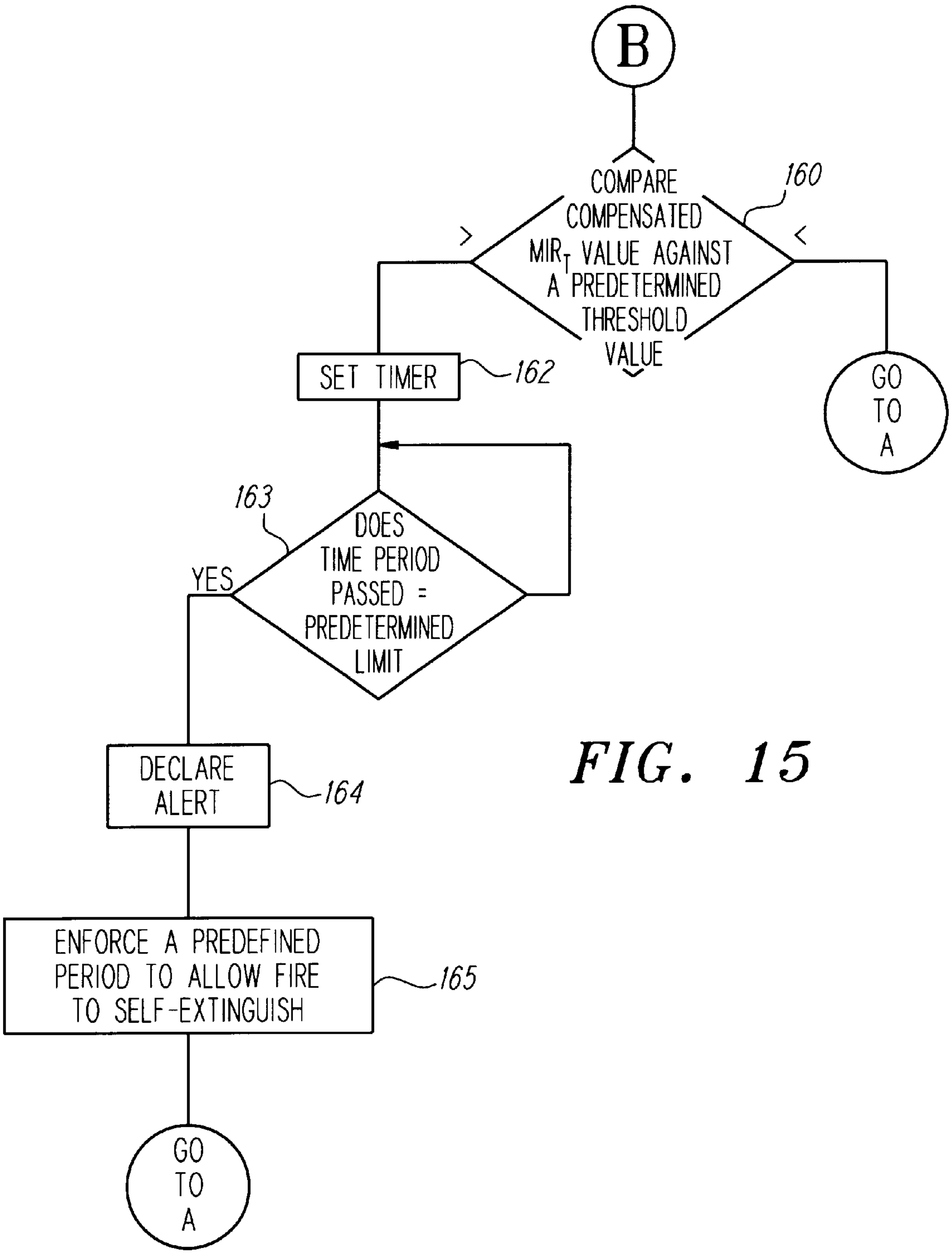
Figure 16:
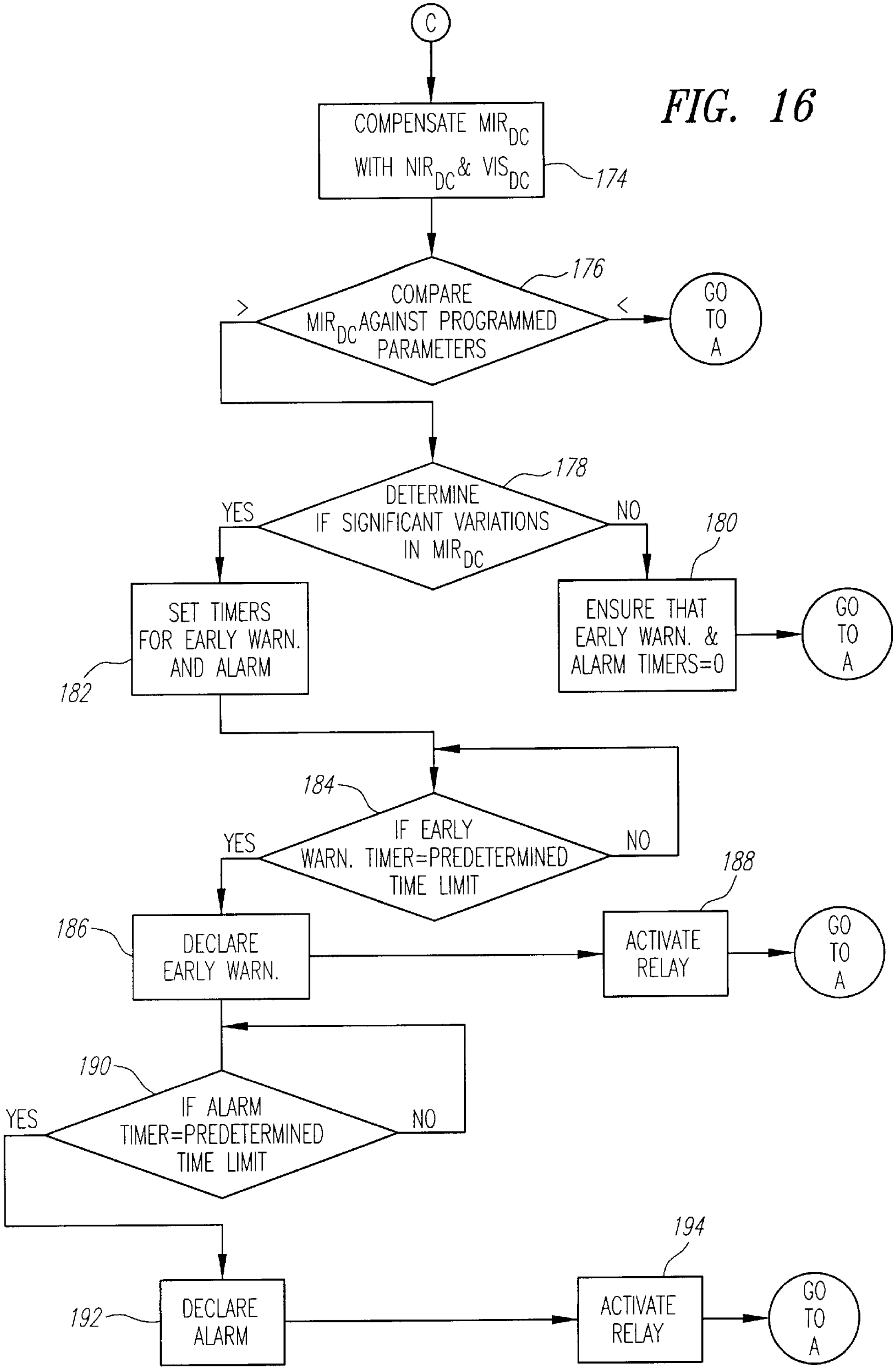

FIGS. 9*a* and 9*b* is an exemplary fire signature, which upon observation would result in an "alert" condition being declared;

FIG. 10 is an exemplary event log generated by the "FirePic" generator for an exemplary fire signature warranting a "fire early warning" condition;

FIGS. 10*a* and 10*b* is an exemplary event log generated by the "FirePic" for an exemplary fire signature warranting a "fire early warning" condition;

FIG. 11 is an exemplary event log generated by the "FirePic" for an exemplary fire signature warranting an "alarm" condition;

FIGS. 11*a* and 11*b* is an exemplary fire signature, which upon observation, would cause an "alarm" condition to be declared;

FIG. 12 is a logic flow diagram of processing as may be embodied in the present system, illustrating the diagnostic evaluations or tests performed by it;

FIG. 13 is a logic flow diagram of processing as may be embodied in the present system, illustrating a lens test performed by it;

FIG. 14 is a portion of the logic flow diagram of processing as may be embodied in the present system, illustrating the logic and sequence of steps performed during the overall operation of the present system;

FIG. 15 is a portion of the logic flow diagram of processing as may be embodied in the present system, illustrating the logic and continued sequence of steps for detecting an "alert" condition; and FIG. 16 is a portion of the logic flow diagram of processing as may be embodied in the present system, illustrating the logic and continued sequence of steps for detecting a "fire early warning" condition and an "alarm" condition.

DETAILED DESCRIPTION OF SOME PREFERRED EMBODIMENTS

Figure 1:
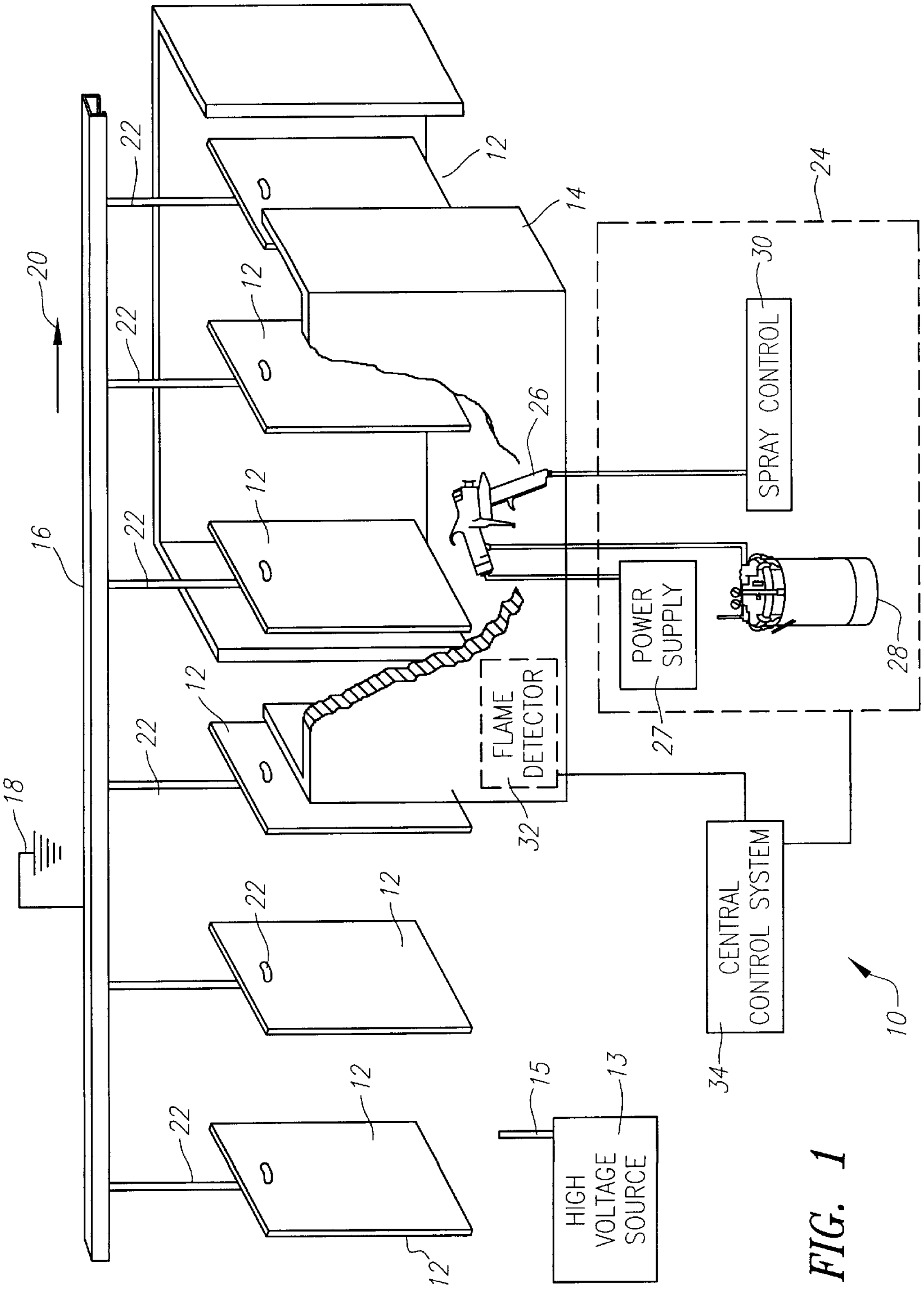
FIG. 1 is a diagrammatic illustration of an exemplary situation, as in an electrostatic coating booth, where the process and system for detecting fire in accordance with the present invention may be utilized to effectively prevent fire, while rejecting false alarms.

The process and system for detecting spark, flame, or fire, in accordance with the present invention is described in conjunction with an exemplary situation of an electrostatic coating operation. However, it should be understood, that the process and system of the present invention may be effectively utilized in any hazardous environment facing faced with a threat from sparks, flames, or fire. FIG. 1 illustrates an exemplary environment 10, as for example, a coating zone, such as a spray or paint booth or enclosure, in which electrostatic coating operations are routinely performed. As illustrated in FIG. 1, parts 12 are transported through the spray booth 14, by a conveyor 16 connected to a reference potential or ground indicated at 18. The direction in which the conveyor moves is indicated by an arrow referenced as 20. The parts 12, are typically supported from the conveyor by a conductive hook-like support or hanger 22. The parts 12 are passed proximate a high voltage source 13 with a high voltage antenna 15. The high voltage source 13 may be one available from Nordson as Model number EPU-9. Electrical charge is transferred from the high voltage source, which may operate between 60,000–120,000 volts, to the parts 12 to be coated.

The electrostatic coating system illustrated in FIG. 1 represents an air electrostatic spray system of a type used in many industrial operations. A typical industrial spray system indicated at 24 includes a spray gun 26 coupled to a power supply 27, a paint supply container 28 (for example, a pressure tank) and some form of spray control mechanism indicated by block 30. The spray control mechanism 30 may include an air compressor and an air regulator (not separately shown).

A single flame detector component 32 is shown located at some strategic position within the spray booth 14. The detector component is manufactured from a substantially explosion-proof material. Depending upon the size of the spray booth 14 or other facility, a plurality of such flame detector components may be strategically located throughout the spray booth 14 or other facility.

Figure 4:
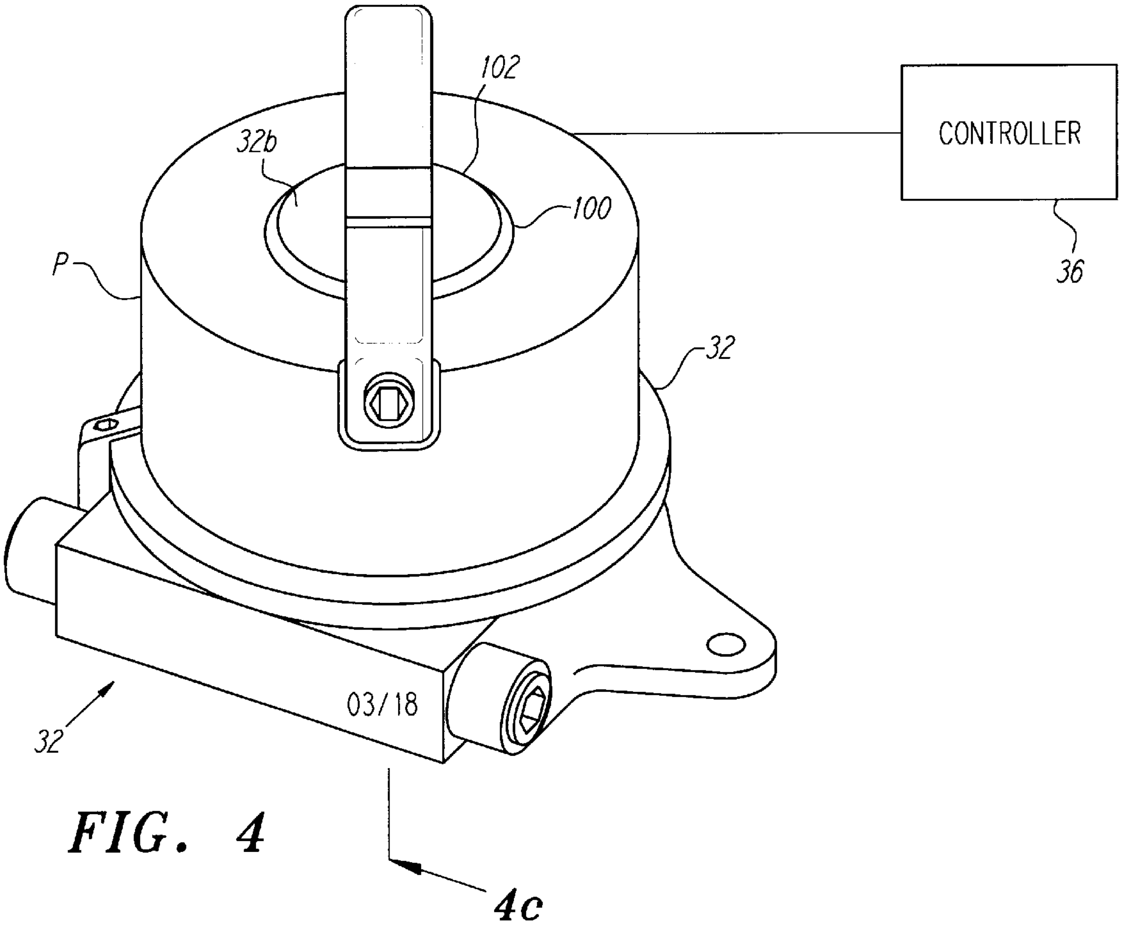
FIG. 4 is a perspective view of a detector component of the system with wide spectrum sensitivity in accordance with the present system.

Referring also to FIG. 4, the flame detector 32 in accordance with the present invention is sensitive to radiant energy in the visible (VIS) band, near band infrared (NIR), and wide infrared (including middle band infrared (MIR)) spectrums. The flame detector 32 has a spectrum sensitivity for infrared energy, within a range from 700–5000 nanometers (0.7 to 5 micrometers) and for visible energy, within a range from 400 to 700 nanometers.

Sensor data captured by the flame detector 32 is relayed to a central control system 34 (FIG. 1), which is shown located outside the spray booth 14. The central control system 34 may take the form of a personal computer with a central microprocessing unit, a display monitor, a suitable memory and printing capabilities. The central control system 34 may coordinate functioning of the flame detectors 32 with other detection systems, as for ungrounded parts or the like.

A controller card 36 with a central microprocessing unit (FIG. 4) may also be provided within the flame detector component 32 itself. In FIG. 4, it is shown external to the flame detector component 32 for purposes of illustration only. Also, note that the flame detector and its housing are both indicated by reference numeral 32.

The flame detector 32 operates by searching for radiant energy characteristics or patterns of a flame or fire. The continuous stream of spectrum data from a sensor array 38 (see FIGS. 6 and 7) is analyzed by a controller (microprocessor, or microcomputer) unit 39 of the central control system 34 or the controller (or microprocessor, or microcomputer) 36.

Figure 6:
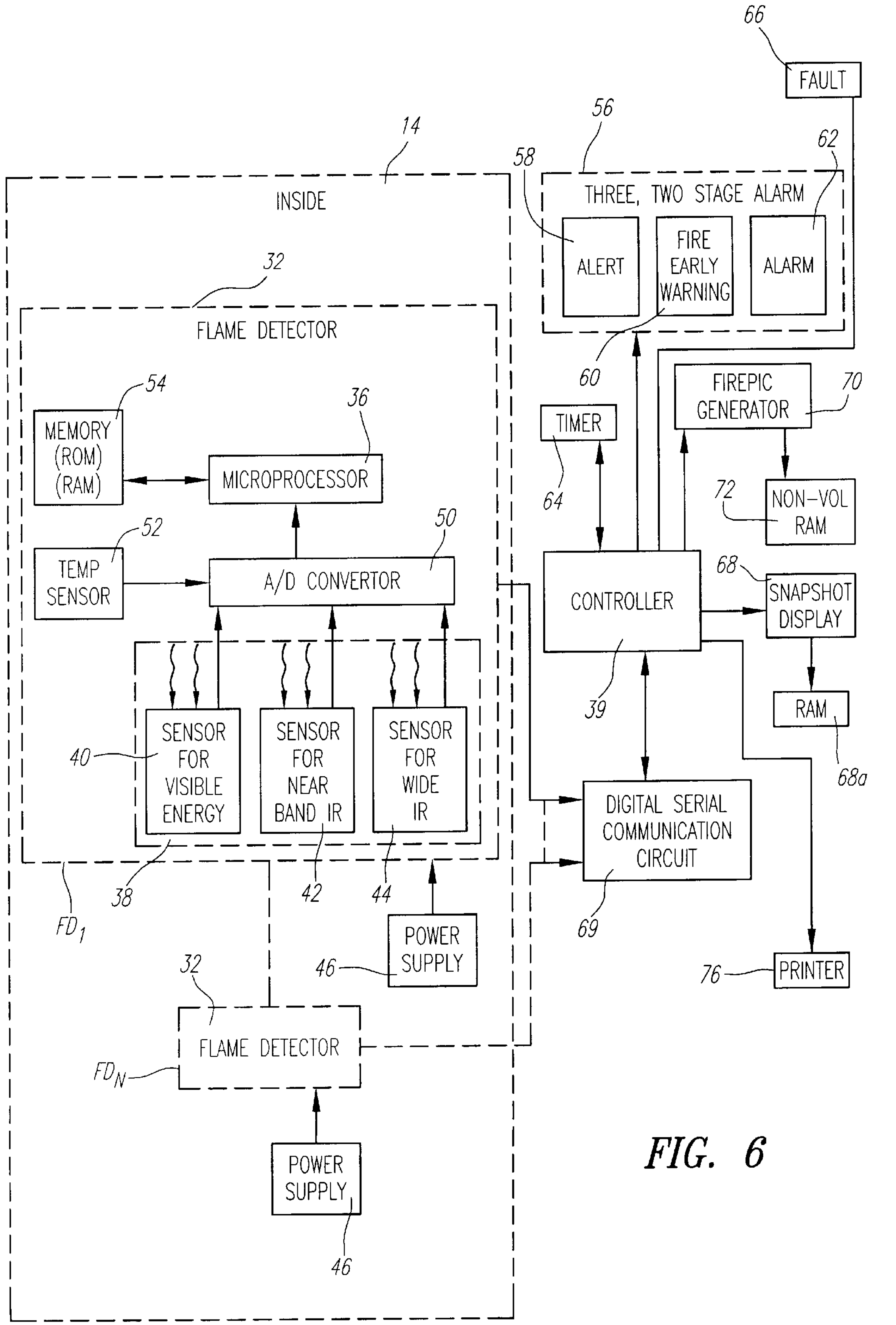
FIG. 6 is a block diagram representation of one embodiment of the present system, wherein a single or a series of flame detector components are located inside a desired facility, such as the paint booth, and a controller component of the system is located outside the facility for processing all the data captured by the sensors.
Figure 7:
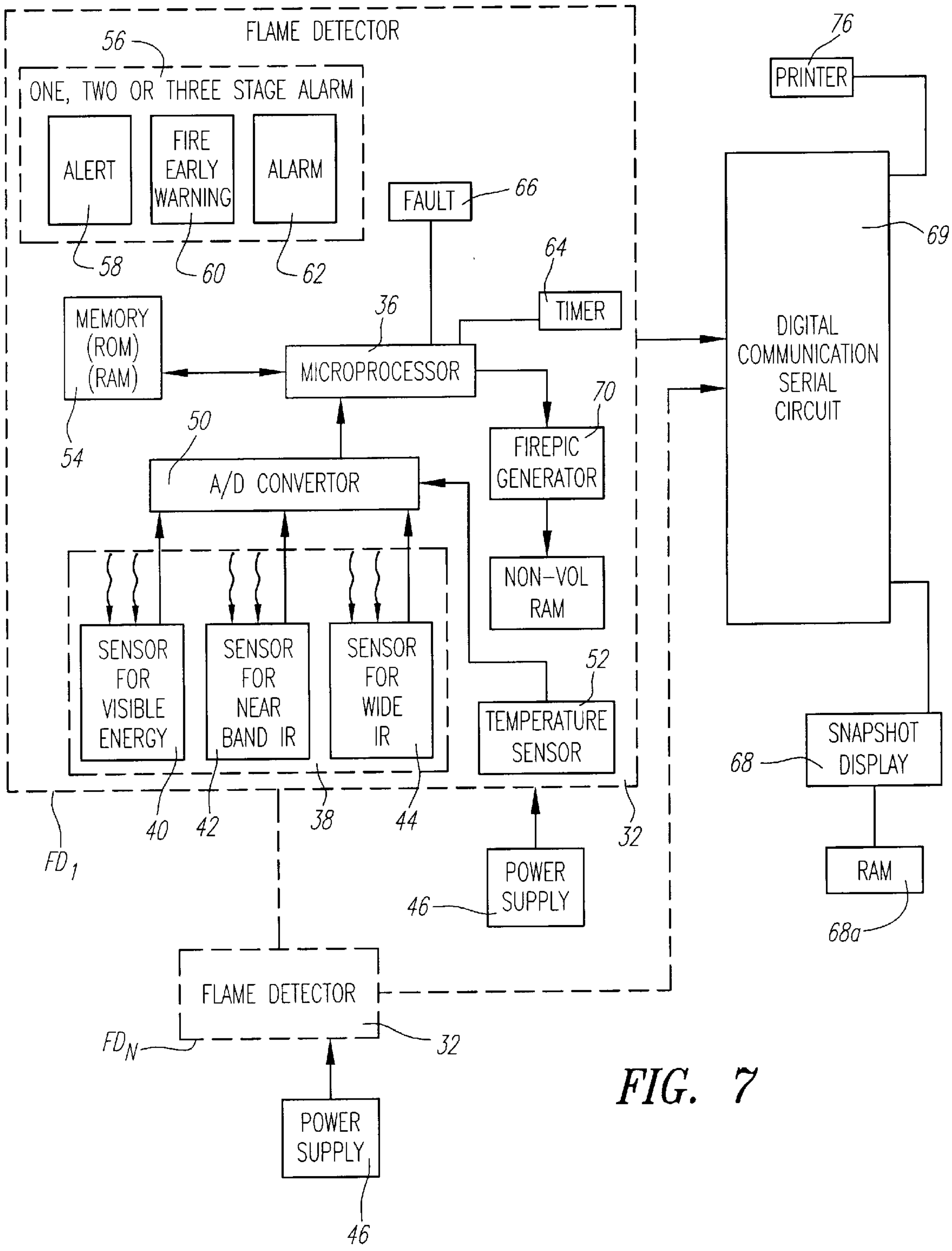
FIG. 7 is a block diagram representation of an alternative embodiment of the system, wherein a single or a series of detectors incorporate a microprocessor and process all the data captured by the in the detector component itself.

Referring to FIGS. 6 and 7, the sensor array 38 has a sensor 40 for sensing radiant energy within the visible band spectrum, a sensor 42 for sensing radiant energy within the near band infrared spectrum, and a sensor 44 for sensing radiant energy within a wide infrared (MIR) spectrum.

Figure 2:
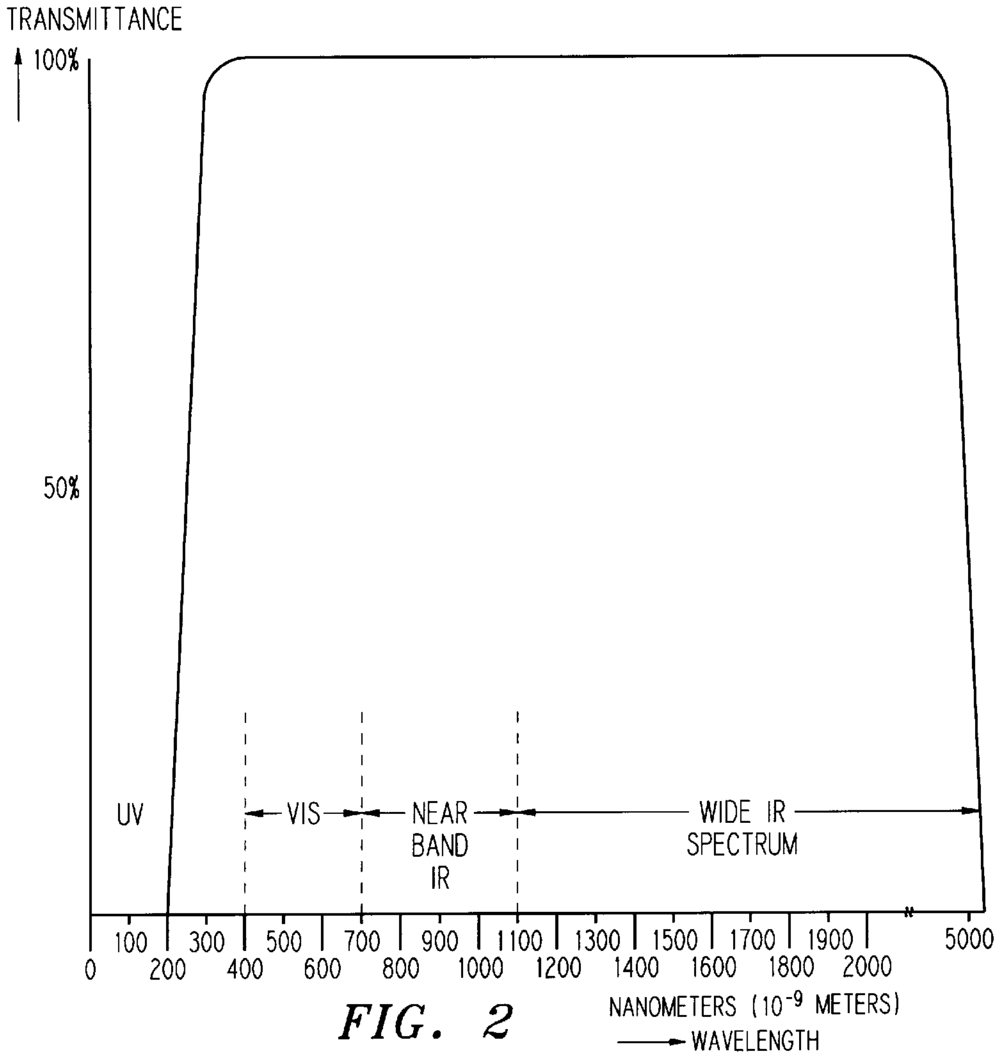
FIG. 2 is a graphical representation of the wide spectrum sensitivity afforded by the present system.

Referring now to FIG. 2, the sensor 40 (FIGS. 6 and 7) searches for and detects radiant energy within the visible band range extending from 400 nanometers to 700 nanometers, and indicated in FIG. 2 as "VIS." The sensor 42 searches for and detects radiant energy within the near band infrared range extending from 700 nanometers to 1100 nanometers, and indicated in FIG. 2 as "NEAR BAND IR." The sensor 44 searches for and detects radiant energy within a wide infrared range extending from 700 nanometers to 5000 nanometers, and indicated in FIG. 2 as "WIDE IR SPECTRUM."

Figure 3:
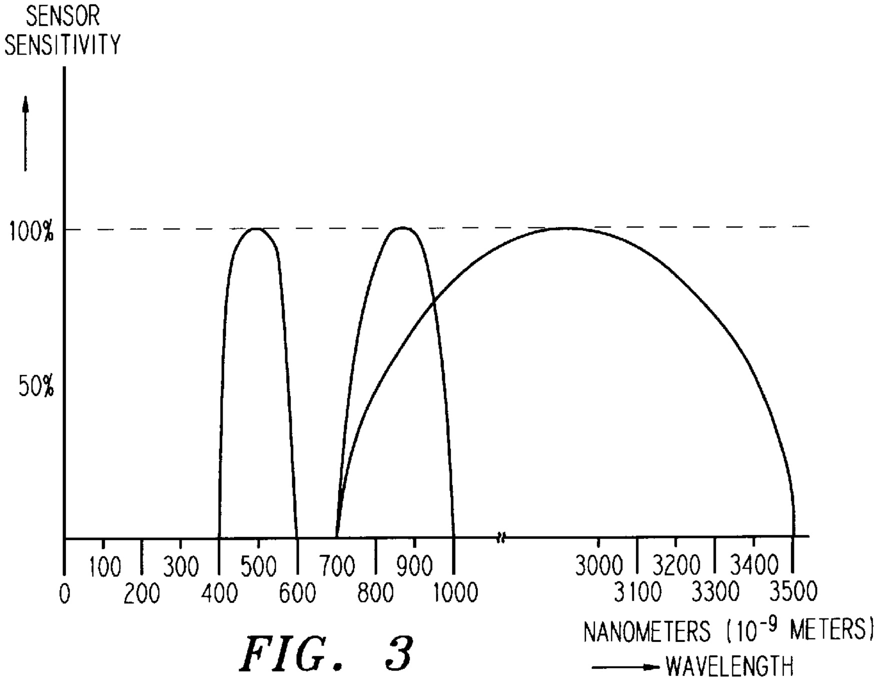
FIG. 3 is a graphical representation of the sensitivity of the sensors of the system in accordance with one embodiment of the invention.
Figure 5:
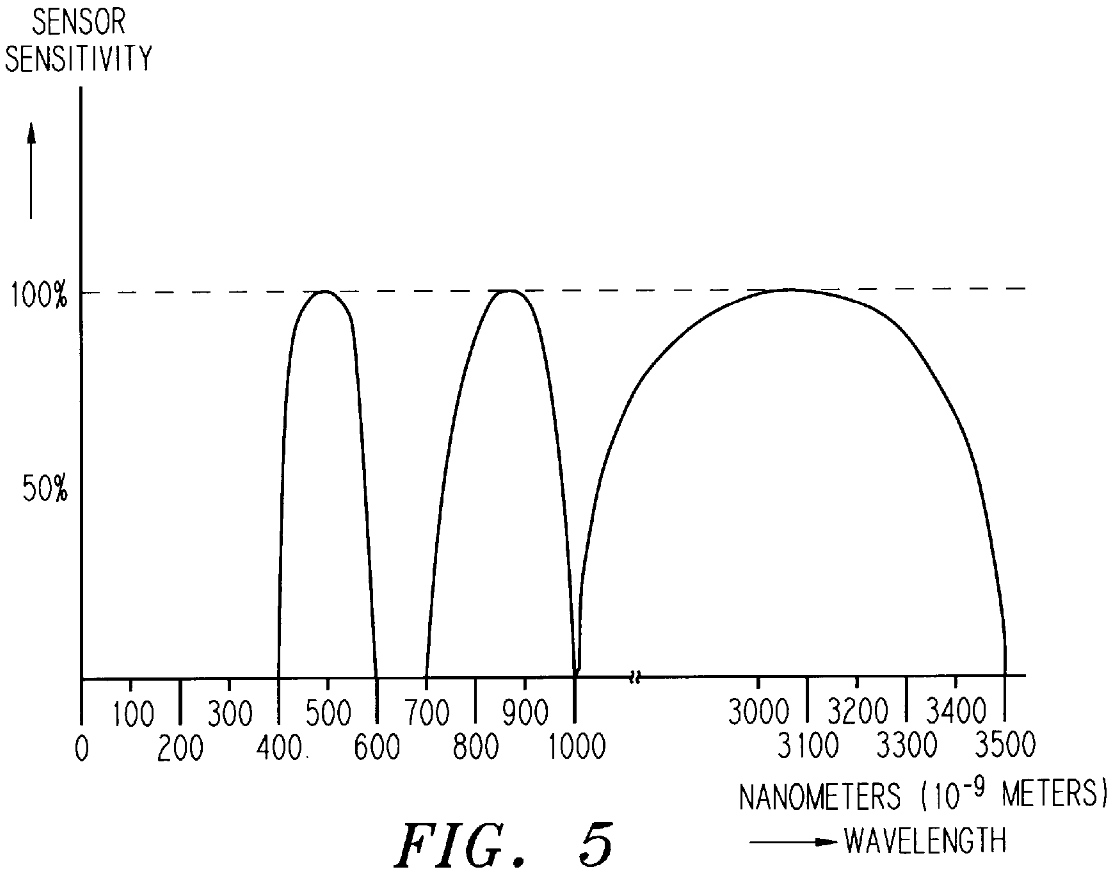
FIG. 5 is a graphical representation of the sensitivity of the sensors of the system in accordance with an alternative embodiment of the invention.

Referring now to FIGS. 3 and 5, sensor sensitivities and sensor types that-are used in the flame detector 32 are illustrated. However, it should be understood that a variety of different sensors may be used in different configurations to accomplish the same purpose. In accordance with one illustrated embodiment (FIG. 3), suitable silicon (Si) photodiode sensors are used for detecting radiant energy within the visible band and near band infrared spectrums. The wavelength (in nanometers) of the radiant energy is indicated along the x-axis and the sensor sensitivity in relative percentage is indicated on the y-axis. For a wide infrared spectrum, a suitable lead sulphide (PbS) sensor is used. With reference specifically to FIG. 5, in accordance with an alternative embodiment, a Germanium photodiode sensor may be sandwiched on top of the lead sulphide (PbS) sensor.

Returning now to FIG. 6, in accordance with one embodiment of the present system, a single flame detector 32 located at a particular location, indicated by reference letters FD1, or a plurality of flame detectors, located at a plurality of different locations, indicated by reference letter FDN, may be located inside the spray booth 14. A power supply 46, typically operating at 24 volts, supplies power to the flame detector 32.

In addition to the sensor array 38, the flame detector 32 comprises an analog to digital (A/D) convertor 50, which receives a continuous stream of analog sensor signals from each of the sensors 40, 42, and 44, converts them into digital signals for selective processing by the microprocessor 36 or the controller 39 or both. A temperature sensor 52 located within the flame detector 32 serves to indicate ambient temperature values for calibration purposes. A memory component 54 within the flame detector comprises ROM (Read Only Memory) and RAM (Random Access Memory) for temporary and permanent storage of data, as for storing instructions for the microprocessor 36, for performing intermediate calculations, or the like.

In accordance with the embodiment illustrated in FIG. 6, sensor digital data (once converted by the A/D convertor) is continuously transmitted to the controller 39. The controller 39 analyses the sensor digital data and determines if there is any sign of sparks, flames, or fire. Upon detecting an "alert," a "fire early warning" or an "alarm" condition, the controller 39 selectively triggers one or more of three individual relays within a three-stage alarm unit 56. The three stage alarm unit 56 comprises an "alert" relay 58, a "fire early warning" relay 60, and an "alarm" relay 62. Each of the relays may be coupled to distinctive LED indicators, audible alarms, or the like.

In accordance with one approach, the controller 39 compares the sensor digital data against programmed threshold values (of characteristics of fire signatures or false alarm models), to determine if the observed data indicates a cause for concern. The controller 39, upon detecting characteristics that warrant an "alert" condition, triggers the "alert" relay. Likewise, the controller 39, upon detecting characteristics that warrant a "fire early warning" condition or an "alarm" condition, triggers either the "fire early warning" relay 60 or the "alarm" relay 62. The appropriate relay may in turn trigger an associated LED indicator or audible alarm. A timer 64 is set in every instance to either reject false alarm situations or allow the flame, or fire sufficient time to self-extinguish. Only upon detecting an "alarm" condition, and that also, after a predetermined time limit, are the suppression agents activated.

In accordance with the general operation the present system typically observes a fire in as little as 16 milliseconds, then, verifies the fire condition multiple times to ensure its existence. Following this exercise, the system declares a "fire early warning" condition. For example, if the fire is a spray gun fire, the present system declares an "alert" condition, to cause shut-down of the spray gun paint flow, electrostatics, and conveyor 16. The present system continues to monitor the fire condition during a predetermined limit of time to allow it to self-extinguish. In the event the fire persists, the present system declares an "alarm" condition and activates release of suppression agents to quell the fire.

In accordance with another feature of the present invention, the microcomputer (otherwise referred to as controller or microprocessor) 36 and the controller verify proper operation of each other, and upon detecting any sign of failure, trigger the fault relay 66.

A real-time graphical display of the digital sensor data detected by the flame detector 32 is generated and viewed at a "SnapShot" display 68. The digital sensor data is represented in the form of relative spectral intensities versus present time. The "Snapshot" display is viewed with an IBM compatible personal computer (with an RS-232 interface port). An associated memory (RAM) 68*a* may store a particular display.

Figure 8:
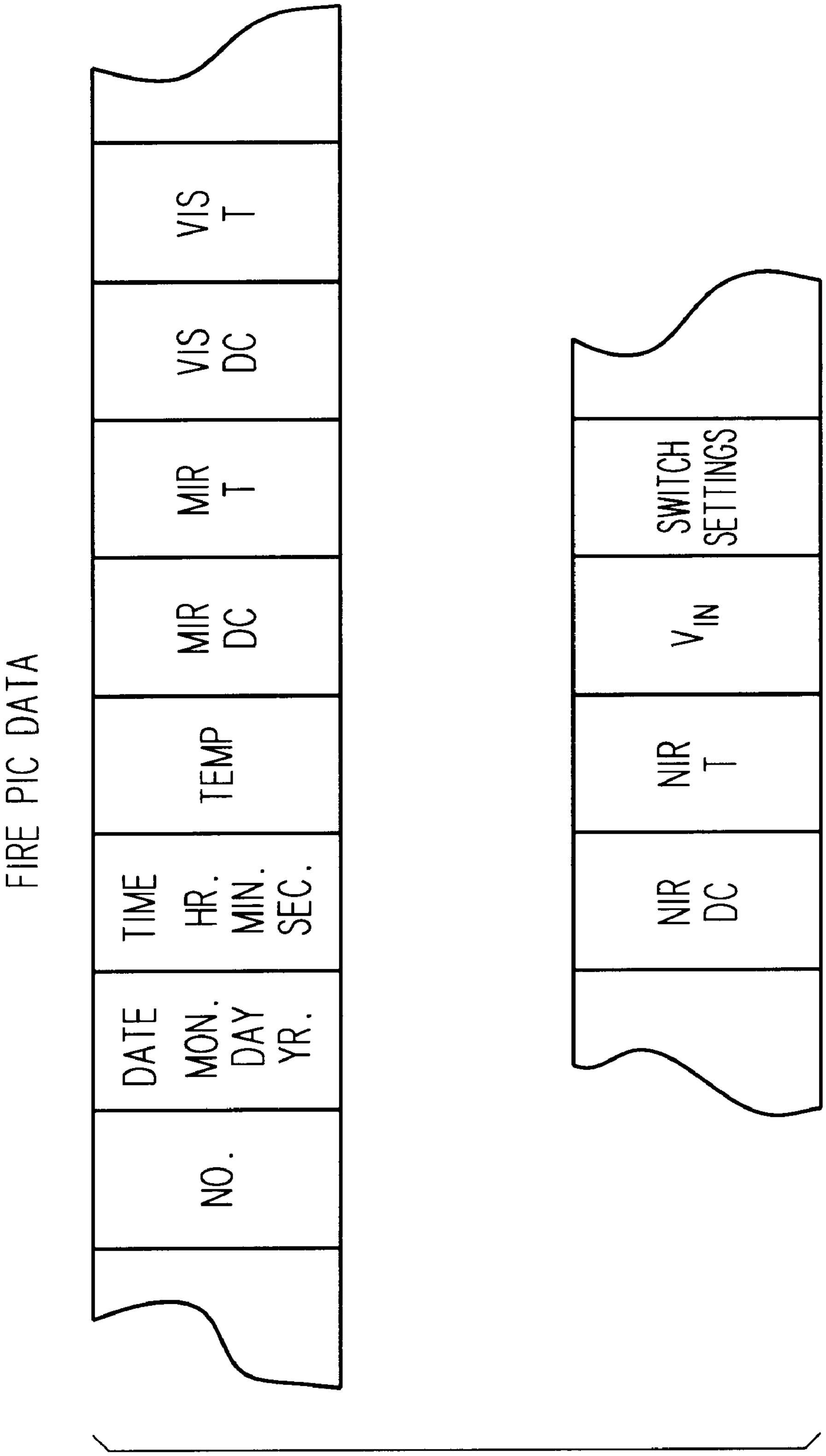
FIG. 8 is a memory field illustrating exemplary data registered which may be retrieved by a "FirePic" generator component of the system.

A "FirePic" generator 70 facilitates retrieval of stored sensor spectral data prior to an occurrence of fire. A graphical display of relative spectral intensities versus time preceding the fire provides evidence to enable analysis and determine the true cause of the fire. The "FirePic" data is stored in a non-volatile RAM indicated at 72. As indicated in FIG. 8, the "FirePic" data may indicate a "FirePic" number, and data such as the date, time, temperature, the $MIR_{(DC\ and\ T)}$, $NIR_{(DC\ and\ T)}$, and the $VIS_{(DC\ and\ T)}$ readings of sensor signal data, the input voltage, and the control switch settings. FIGS. 9, 10, and 11 indicate "alert," "fire early warning," and "alarm" events, relating to exemplary fire signatures. FIGS. 9*a* and 9*b* represent an exemplary fire signature that would trigger the "alert" relay 58. FIGS. 10*a* and 10*b* represent an exemplary fire signature that would trigger the "fire early warning" relay 60. FIGS. 11*a* and 11*b* represent an exemplary fire signature that would trigger an "alarm" relay 62. A printout of a graphical display (from the "FirePic" generator, or the "SnapShot" display, or of fire signatures) may be obtained with a printer 76.

The controller 39 initially and routinely after preselected periods of time, such as every 10 minutes seconds, performs diagnostic evaluation or tests on select system components, such as checking for continuity through the relay coils, checking to ensure that the control setting are as desired, and so on. Upon detecting some cause for concern, the diagnostic test relating to the area of concern may be performed every 30 seconds or any such preselected period of time. It should be understood that any or all the parameter including reaction times etc., may be programmed to address particular requirements.

A digital serial communication circuit 69 (see FIGS. 6 and 7) controls serial connections of one or more of a plurality of flame detectors 32 to the controller 39 to ensure clear communication through the otherwise noisy environment.

Referring now to FIG. 7, in accordance with an alternative embodiment of the present system, the microprocessor 36 located within the flame detector 32 itself processes all the sensor digital data to determine the nature of the prevailing condition and triggers an appropriate one of the three stage alarm unit 56. In this embodiment only the "SnapShot" display 68 and its associated memory 68*a* is located external to the detector component 32. The digital communication serial circuit 68 controls serial connections of one or more of a plurality of flame detectors 32 to any peripheral devices such as the printer 76, "SnapShot" display 60 etc.

The system performs extensive diagnostic evaluations, the logic of which will now be considered with reference to FIG. 12. A start of the diagnostic evaluation operations is indicated by reference numeral 80. To ensure that the "alarm" relays are functioning properly, current is passed through each of the relay coils, as illustrated by a block 82. Continuity of current through the relay coils is determined as illustrated by a block 84.

The diagnostic evaluation proceeds to check the control settings for the various system components. The step is illustrated by a block 86. The control settings are compared against stored data on control settings desired by a user, as indicated by a decision block 88. If the control settings are as desired, the diagnostic evaluation operation proceeds to the next step. If the control settings are not as desired, they are initialized in accordance with the stored data, as indicated by a block 90. The next step in the diagnostic evaluation is a test to determine communication between the detector unit and the controller unit. This step is illustrated by a query block 92. In the event the communications are satisfactory, operation proceeds to a step illustrated by a block 94 which indicates that the system is ready to commence its detection operations. In the event the communications are not satisfactory, steps to correct any existing problems may be taken, as indicated by a block 96. After the communication problems are corrected or solved, operation returns to the query block 92, until communications between the detector and the controller are found to be satisfactory.

With reference to FIG. 13, a lens test is performed by the system to ensure its optimum performance. At the outset, it should be noted that a lens 100 (FIG. 4) is provided on the face of the detector 32 which is held in place by a detector grille 102 (FIG. 4). A start of the lens test is indicated at 104. Light from an infrared LED (not shown) is transmitted from within the detector 32 through the lens 100 of the detector 32. This step is illustrated by a block 106. The intensity of light reflected back by the detector grill 102 is measured to determine the transmittance level of the detector lens 100. This step is illustrated by a block 108. Preset threshold intensity values (of transmittance) provided by the lens manufacturer are stored as indicated by a block 110. As illustrated by a decision block 112, the measured intensity values are compared against the stored values to determine if there is any degradation in transmittance characteristics or levels. In the event the measured intensity values are grated than the stored values, the system proceeds to the next step indicated by a block 114. At that point, the overall system operation for detection can commence. In the event the measured intensity values are less than the stored values, indicating degraded transmittance characteristics, operation proceeds to the next step indicated by a block 116.

The measured intensity values are registered in memory and a number is assigned to each registered value. A decision block 118 determines if the number of intensity values registered exceed the number 10. If the answer is in the affirmative, the test proceeds to one of two options. Under option one, in the event there are multiple detectors, a fault condition is relayed to an external computer, as illustrated by a block 120. Under option two, a fault condition is declared and an alarm is sounded, as illustrated by a block 122. If the answer to decision block 118 is in the negative, as illustrated by a block 124, the lens test is repeated every 30 seconds.

With reference to FIGS. 14, 15, and 16, the logic for the overall system operation for detection is described. Once the system is installed at a desired facility, prior to operation of the system the control settings for the various system components are programmed. Referring now to FIG. 14, a start is indicated at a block 150. The system of the present invention runs diagnostic evaluations, such as those described above, at the very outset and repeatedly during system operation to ensure proper functioning of all its system components. This step is illustrated by a block 152. Following the diagnostic evaluations, the parameters for the system components are adjusted in accordance with ambient conditions. A block 154 illustrates this step. Sensor signals from each of the sensors $MIR_{(DC\ and\ T)}$, $NIR_{(DC\ and\ T)}$ and $VIS_{(DC\ and\ T)}$ are received from the sensor array 38, as illustrated by a block 156. At this point, operations split into two paths, indicated as a path 1 (for detecting an "alert" condition) and a path 2 (for detecting "fire early warning" and "alarm" conditions).

To determine an "alert" condition, transient sensor signals $MIR_T$, $NIR_T$, and $VIS_T$ are monitored, as illustrated by a block 158. The $MIR_T$ signal value is compensated by subtracting the $VIS_T$ signal value, from it as illustrated by a block 159.

Referring now to FIG. 15, the compensated $MIR_T$ signal value is compared against a predetermined threshold value, as indicated by a decision block 160. If the compensated $MIR_T$ signal value exceeds the predetermined threshold value, an "alert" timer is set as indicated by a block 162. In the next step, illustrated by a decision block 163, the system determines if a predetermined time limit has passed. Once the predetermined time limit is passed, an "alert" condition is declared, as illustrated by a block 164.

Following that step, another predetermined period of time is enforced or allowed to pass, during which no action is taken, in order to allow the fire to self-extinguish. This step is illustrated by a block 165. After that point, operation loops back to point A, whereby the system again receives sensor signals. Of course, until the predetermined time limit actually expires, operation loops back to the point before decision block 163.

Referring again to FIG. 14, to determine a "fire early warning" condition or an "alarm" condition, sensor signals $MIR_{DC}$, $NIR_{DC}$, and $VIS_{DC}$ are passed through long term and short term averaging filters as illustrated by a block 166. These signals are monitored to obtain values as illustrated by a block 168. To eliminate false alarm rejection, in the event the short term filter output values are less than the long term filter output values, as illustrated by a decision block 170, the long term filter output values are jam set (forced) to adopt the short term filter output values, as illustrated by a block 172.

Referring now to FIG. 16, the sensor signal $MIR_{DC}$ reading is compensated by the sensor signals $NIR_{DC}$ and visible $_{DC}$ readings, as illustrated by a block 174. This step is taken to distinguish a real fire from other sources more likely to emit substantial visible light. Once the $MIR_{DC}$ signal is compensated to eliminate declaring a false alarm, the $MIR_{DC}$ signal values is compared against programmed parameters, as indicated by a decision block 176. In the event the $MIR_{DC}$ signal value is determined to be less than the programmed parameters, operation loops back to point A, beginning the cycle of receiving the sensor signals from the sensor array 38, and so on.

In the event the $MIR_{DC}$ signal value is greater than the programmed parameters, a decision block 178 determines if the variations in the $MIR_{DC}$ signal values are significant. If it is determined that the variations in the $MIR_{DC}$ signal values are not significant, as illustrated by a block 180, the system ensures that the "fire early warning" and "alarm" timers are set to zero. Following that, operation once again loops back to point A.

If it is determined that the variations in $MIR_{DC}$ signal values are significant, the timers for the "fire early warning"

and the "alarm" are set to begin counting. This step is illustrated by a block 182. If the "fire early warning" timer indicates that a predetermined time limit has passed, as indicated by a decision block 184, a "fire early warning" condition is declared, as illustrated by a block 186. Once the "fire early warning" condition is declared, the appropriate relay is activated as illustrated by a block 188. At that point, operation may ultimately loop back to point A. Of course, until the predetermined time limit has expired, operation loops back to the point before decision block 184.

Once a "fire early warning" is declared, as illustrated by a decision block 190, the system determines if the "alarm" timer indicates that a predetermined time limit has passed. If not, operation loops back to the point before decision block 190, to ensure that the appropriate time limit has passed. If the "alarm" timer indicates that a predetermined time limit has passed, as indicated by a decision block 190, a "alarm" condition is declared, as illustrated by a block 192. Once the "alarm" condition is declared, the appropriate relay is activated as illustrated by a block 194. At that point, operation ultimately may loop back to point A.

While the invention has been described in conjunction with specific embodiments thereof, many alternatives, modifications and variations will be apparent to those skilled in the art in view of the foregoing description. Accordingly, it is intended to embrace all such alternatives, modifications and variations which fall within the spirit and scope of the appended claims.

What is claimed is:

1. A fire detection system, comprising:

a sensor array including a sensor for visible energy, a sensor for near band IR, and a sensor for wide IR, for providing sensor signals;

a temperature sensor for providing signals indicative of ambient temperature conditions;

a controller coupled to said sensor array and said temperature sensor for receiving said sensor signals from said sensor array and said signals from said temperature sensor, said controller calibrating operation parameters for said fire detection system in accordance with said signals from said temperature sensor, and processing said sensor signals to determine one of three conditions associated therewith; and a multi-stage alarm system coupled to said controller, said controller selectively activating a select one of three relays of said multi-stage alarm system, depending upon said one of three conditions determined by said controller.

* * * * *